US012455194B2

(12) United States Patent
Timler et al.

(10) Patent No.: US 12,455,194 B2
(45) Date of Patent: Oct. 28, 2025

(54) SYSTEMS AND METHODS FOR USING OPTICAL SENSORS IN FIRE SUPPRESSION SYSTEMS

(71) Applicant: Tyco Fire Products LP, Lansdale, PA (US)

(72) Inventors: Jeffrey R. Timler, Peshtigo, WI (US); Brian L. Counts, Menominee, MI (US)

(73) Assignee: Tyco Fire Products LP, Cranston, RI (US)

( * ) Notice: Subject to any disclaimer, the term of this patent is extended or adjusted under 35 U.S.C. 154(b) by 871 days.

(21) Appl. No.: 17/614,661

(22) PCT Filed: May 22, 2020

(86) PCT No.: PCT/IB2020/054895
§ 371 (c)(1),
(2) Date: Nov. 29, 2021

(87) PCT Pub. No.: WO2020/240383
PCT Pub. Date: Dec. 3, 2020

(65) Prior Publication Data
US 2022/0228915 A1 Jul. 21, 2022

Related U.S. Application Data

(60) Provisional application No. 62/855,440, filed on May 31, 2019.

(51) Int. Cl.
*G01J 5/00* (2022.01)
*A62C 37/36* (2006.01)
*G08B 17/12* (2006.01)

(52) U.S. Cl.
CPC ............ *G01J 5/0018* (2013.01); *A62C 37/04* (2013.01); *G08B 17/12* (2013.01)

(58) Field of Classification Search
CPC ...... G01J 5/0018; G01J 5/0014; G08B 17/12; G08B 29/043; G08B 17/10; G08B 29/183; G08B 5/38; A62C 37/04; A62C 37/40
(Continued)

(56) References Cited

U.S. PATENT DOCUMENTS 3,993,138 A 11/1976 Stevens et al.
6,170,480 B1 1/2001 Melink
(Continued)

FOREIGN PATENT DOCUMENTS

CN 106802622 A 6/2017
KR 101311950 B1 9/2013
WO WO-2012/021552 A2 2/2012

OTHER PUBLICATIONS

International Search Report and Written Opinion on International Application No. PCT/IB2020/054895, mail date Sep. 4, 2020, 22 pages.

*Primary Examiner* — Kristina M Deherrera
*Assistant Examiner* — Evan Mancini
(74) *Attorney, Agent, or Firm* — Foley & Lardner LLP

(57) ABSTRACT

A fire suppression system includes an interface control module, and an interface module. The interface control module can activate a fire suppressant discharge system in response to receiving a fire detection signal. The interface module is connected with the interface control module and is connected with at least one of a first optical sensor and an interface expansion module. The interface expansion module is configured to connect with a second optical sensor. The first optical sensor and the second optical sensor are configured to detect a fire condition at an area of interest and provide the first detection signal to the interface control module in response to detecting the fire. The interface module includes light emitting devices corresponding to the
(Continued)

first optical sensor and the interface expansion module, the light emitting devices configured to display different colors indicating a status of the first optical sensor and the interface expansion module.

19 Claims, 3 Drawing Sheets

(58) Field of Classification Search
USPC .............................................................. 116/5
See application file for complete search history.

(56) References Cited

U.S. PATENT DOCUMENTS

| | | | | |
|---|---|---|---|---|
| 8,227,756 | B2 | 7/2012 | Harchanko | |
| 8,547,238 | B2 | 10/2013 | Harchanko | |
| 9,526,931 | B2 * | 12/2016 | Ferguson | A62C 37/36 |
| 9,530,304 | B2 * | 12/2016 | Clarke | G08B 7/066 |
| 10,039,945 | B2 | 8/2018 | Sandahl et al. | |
| 2003/0058114 | A1 * | 3/2003 | Miller | G08B 29/183 340/577 |
| 2011/0040416 | A1 * | 2/2011 | Nickerson | G05B 15/02 700/284 |
| 2014/0069665 | A1 | 3/2014 | Fernstrum et al. | |
| 2015/0231431 | A1 | 8/2015 | Sandahl et al. | |
| 2015/0251031 | A1 | 9/2015 | Sandahl et al. | |
| 2015/0367157 | A1 * | 12/2015 | Rohlik | A62C 35/11 701/29.2 |
| 2016/0125729 | A1 * | 5/2016 | Clarke | G06Q 90/205 340/577 |
| 2018/0369625 | A1 | 12/2018 | Sandahl et al. | |
| 2019/0091501 | A1 | 3/2019 | Fernstrum et al. | |
| 2019/0160316 | A1 | 5/2019 | Counts et al. | |
| 2019/0175969 | A1 | 6/2019 | Sandahl et al. | |

* cited by examiner

SYSTEMS AND METHODS FOR USING OPTICAL SENSORS IN FIRE SUPPRESSION SYSTEMS

CROSS-REFERENCE TO RELATED PATENT APPLICATION

The present application claims the benefit of and priority to U.S. Provisional Patent Application No. 62/855,440, filed May 31, 2019, the entire disclosure of which is incorporated by reference herein.

BACKGROUND

Fire suppression systems are commonly used to protect an area and objects within the area from fire. Fire suppression systems can be activated manually or automatically in response to an indication that a fire is present nearby (e.g., an increase in ambient temperature beyond a predetermined threshold value, etc.). Once activated, fire suppression systems spread a fire suppressant agent throughout the area. The fire suppressant agent then extinguishes or prevents the growth of the fire. Various sprinklers, nozzles, and dispersion devices are used to disperse the fire suppressant agent throughout the area.

SUMMARY

One implementation of the present disclosure is a fire suppression system. The fire suppression system includes an interface control module, and an interface module, according to some embodiments. The interface control module is configured to activate a fire suppressant discharge system in response to receiving a fire detection signal, according to some embodiments. In some embodiments, the interface module is connected with the interface control module, and is connected with at least one of a first optical sensor and an interface expansion module. In some embodiments, the interface expansion module is configured to connect with a second optical sensor. In some embodiments, the first optical sensor and the second optical sensor are configured to detect a fire condition at an area of interest and provide the first detection signal to the interface control module in response to detecting the fire. In some embodiments, the interface module includes light emitting devices corresponding to the first optical sensor and the interface expansion module, the light emitting devices configured to display different colors indicating a status of the first optical sensor and the interface expansion module.

In some embodiments, the light emitting devices are configured to display a first color when the first optical sensor and the interface expansion module are operating normally, a second color when the first optical sensor or the interface expansion module undergo a fault, and a third color when the first optical sensor or the second optical sensor of the interface expansion module detect a fire condition.

In some embodiments, the light emitting devices are configured to continually display the second color in response to a downstream fault.

In some embodiments, the interface module includes a reset button. In some embodiments, the light emitting device is configured to cease continually displaying the second color in response to the reset button being depressed for a predetermined amount of time.

In some embodiments, the interface module and the interface expansion module are each configured to connect with three optical sensors. In some embodiments, the interface module and the interface expansion module each include three light emitting devices corresponding to the three optical sensors.

In some embodiments, the interface module includes a light emitting device associated with the interface expansion module. In some embodiments, the light emitting device is configured to display different colors to indicate the status of any of the three optical sensors connected with the interface expansion module.

In some embodiments, the interface expansion module includes a light emitting device corresponding to the second optical sensor. In some embodiments, the light emitting device is configured to display different colors indicating a status of the second optical sensor.

In some embodiments, the light emitting device of the interface expansion module is configured to display a first color in response to the second optical sensor operating normally, a second color in response to the second optical sensor undergoing a fault, and a third color in response to the second optical sensor detecting a fire condition.

In some embodiments, the light emitting device of the interface expansion module is configured to continually display the second color in response to the second optical sensor undergoing a fault and continue displaying the second color after the second optical sensor ceases undergoing the fault. In some embodiments, the light emitting device of the interface expansion module is configured to cease displaying the second color in response to a user input.

In some embodiments, the fire suppression system of further includes an additional interface expansion module. In some embodiments, the additional interface expansion module is connected with the interface expansion module and is configured to connect with three optical sensors.

In some embodiments, the optical sensors are infrared optical sensors and are configured to generate sensor signals. In some embodiments, the sensor signals include either a standby signal, or the fire detection signal.

Another implementation of the present disclosure is a fire suppression system. In some embodiments, the fire suppression system includes a first sensor, an interface expansion module, a second sensor, an interface module, and an interface control module. In some embodiments, the first sensor is configured to detect a fire condition and generate fire detection signals in response to detecting the fire. In some embodiments, the interface expansion module is configured to receive the fire detection signals from the first sensor and operate a first indicator to indicate a status of the first sensor. In some embodiments, the second sensor is configured to detect a fire condition and generate fire detection signals in response to detecting the fire. In some embodiments, the interface module is configured to receive the fire detection signals from the second sensor and the fire detection signals from the interface expansion module. In some embodiments, the interface module includes a second indicator corresponding to the second sensor, and a third indicator corresponding to the first sensor and the interface expansion module. In some embodiments, the second indicator is configured to display a status of the second sensor, and the third indicator is configured to display a status of the first sensor and the interface expansion module. In some embodiments, the interface control module is configured to receive the fire detection signals generated by any of the first sensor and the second sensor from the interface module and activate a fire suppressant discharge system in response to the fire detection signals.

In some embodiments, the first indicator is configured to display a first color when the first optical sensor is operating normally, a second color when the first optical sensor undergoes a fault, and a third color when the first optical sensor detects a fire condition. In some embodiments, the second indicator is configured to display the first color when the second optical sensor is operating normally, the second color when the second optical sensor undergoes a fault, and the third color when the second optical sensor detects a fire condition. In some embodiments, the third indicator is configured to display the first color when the first optical sensor and the interface expansion module are operating normally, the second color when the first optical sensor or the interface expansion module undergo a fault, and the third color when the first optical sensor or the interface expansion module detect a fire condition.

In some embodiments, the first indicator, the second indicator, and the third indicator are configured to continually display the second color in response to a downstream fault.

In some embodiments, the interface module includes a reset button. In some embodiments, the first indicator is configured to cease displaying the second color in response to the reset button being depressed for a predetermined amount of time.

In some embodiments, the interface module and the interface expansion module are each configured to connect with three optical sensors. In some embodiments, the interface module and the interface expansion module each include an indicator configured to operate to display a status of any of the three optical sensors.

In some embodiments, the fire suppression system further includes an additional interface expansion module. In some embodiments, the additional interface expansion module is connected with the interface expansion module and is configured to connect with three optical sensors.

Another implementation of the present disclosure is a fire suppression system. In some embodiments, the fire suppression system includes a first sensor, an interface expansion module, a second sensor, an interface module, and an interface control module. In some embodiments, the first sensor is configured to detect a fire condition and generate fire detection signals in response to detecting the fire. In some embodiments, the interface expansion module is configured to receive the fire detection signals from the first sensor and operate a first indicator to indicate a status of the first sensor. In some embodiments, the second sensor is configured to detect a fire condition and generate fire detection signals in response to detecting the fire. In some embodiments, the interface module is configured to receive the fire detection signals from the second sensor and the fire detection signals from the interface expansion module. In some embodiments, the interface module includes a second indicator corresponding to the second sensor, and a third indicator corresponding to the first sensor and the interface expansion module. In some embodiments, the second indicator is configured to display a status of the second sensor, and the third indicator is configured to display a status of the first sensor and the interface expansion module. In some embodiments, the interface control module is configured to receive the fire detection signals generated by any of the first sensor and the second sensor from the interface module and activate a fire suppressant discharge system in response to receiving the fire detection signals. In some embodiments, the first indicator, the second indicator, and the third indicator are configured to continually indicate a fault status of a corresponding circuit even after the fault status of the corresponding circuit clears, until a user input is received.

In some embodiments, the fire suppression system further includes an additional interface expansion module. In some embodiments, the additional interface expansion module is connected with the interface expansion module and is configured to connect with three optical sensors.

In some embodiments, the additional interface expansion module includes multiple indicators. In some embodiments, each of the multiple indicators are configured to operate to display a status of a corresponding one of the three optical sensors.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
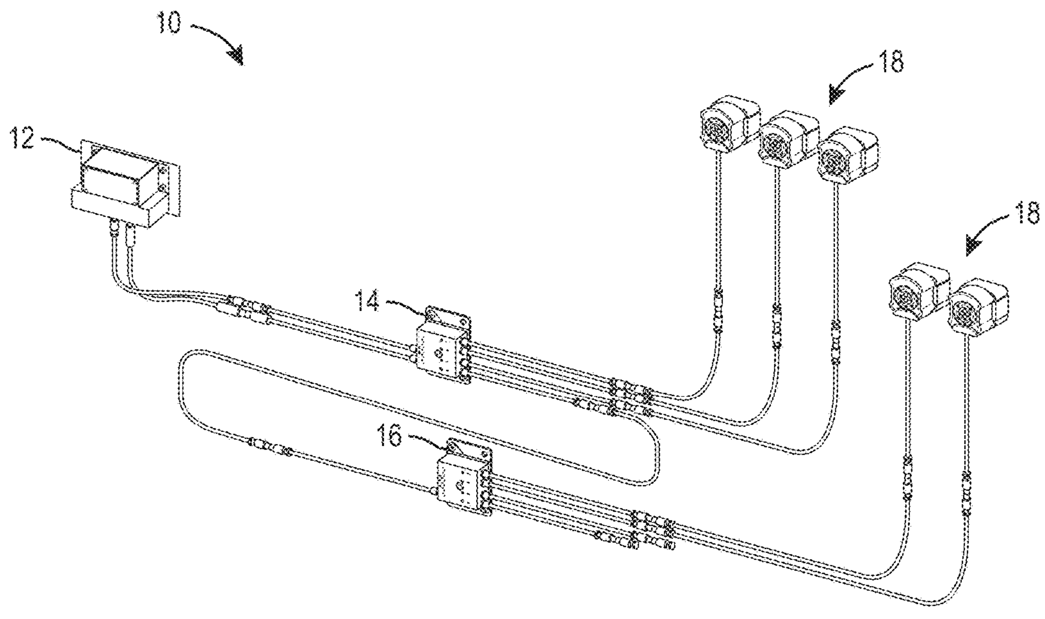
FIG. 1 is a perspective view of a portion of a fire detection and suppression system including an interface module, an interface expansion module, and optical sensors, according to some embodiments.

Before turning to the figures, which illustrate the exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

Overview

Referring generally to the FIGURES, a fire suppression system includes an interface control module, an interface module, and an interface expansion module. The system can also include optical sensors configured to monitor an area of interest to detect a presence of fire in the area of interest. The sensors can be communicably and wiredly coupled with corresponding interface expansion modules and/or corresponding interface modules. Each interface module and/or interface expansion module can communicably connect with up to three sensors. The interface expansion modules can be daisy-chained in series with the interface module. For example, the interface module can connect with a first set of three sensors, and a first interface expansion module. The first interface expansion module can connect with a second set of three sensors and a second interface expansion module. The second interface expansion module can connect with a third set of three sensors.

Each connection between upstream and downstream devices in the daisy-chain can be associated with a corresponding light emitting device (LED). For example, the interface module can include a first set of four LEDs, with each of the four LEDs indicating status of the connected and corresponding sensors and first interface expansion module. Likewise, the first interface expansion module can include a second set of four LEDs, with each of the four LEDs indicating status of the connected and corresponding sensors and second interface expansion module. The second interface expansion module can include similar LEDs.

The LEDs can operate to notify an operator or a technician regarding various conditions. For example, the LEDs can indicate a normal operating mode of the corresponding sensor or interface expansion module by displaying a green color. The LEDs can indicate that a fire or a fire condition (e.g., flames, smoke, a temperature condition, a rate of change of a temperature condition, etc.) has been detected by one of the corresponding sensors or interface expansion modules by displaying a red color. The LEDs can indicate that a fault has occurred with one of the corresponding sensors or interface expansion modules by displaying a yellow/amber color.

The LEDs can latch the yellow/amber color if an intermittent fault occurs. For example, if the first interface expansion module undergoes an intermittent fault, the corresponding LED at the interface module can display the yellow/amber color, even after the first interface expansion module returns to normal operation. In some embodiments, the LEDs display the yellow/amber color in response to any circuitry further downstream undergoing a fault. For example, if one of the sensors that are connected with the second interface expansion module fault, the corresponding LED of the second interface expansion module can display the yellow/amber color. The second interface expansion module can provide the first interface expansion module with a fault signal, such that the LED of the first interface expansion module that corresponds to the second interface expansion module displays the yellow/amber color. In this way, a technician can visually identify and troubleshoot faulty components. The technician may start upstream at the interface module and work downstream to identify any faulty components.

Any of the electrical components (e.g., sensors, modules, etc.) may be plug-and-play devices such that they can be easily removed, replaced, and installed. The sensors can communicate fire detection information (e.g., sensor signals) to the interface control module. In response to receiving an indication that a fire or a fire condition is detected by one or more of the sensors, the interface control module can operate a user device to display a warning or alert, and may activate a fire suppressant discharge system to suppress the fire. The warning or alert provided to the user can include operating an LED or a light emitting device to display a particular color (e.g., red) and/or intermittently display the color (e.g., strobing, periodically, etc.).

System

Figure 2:
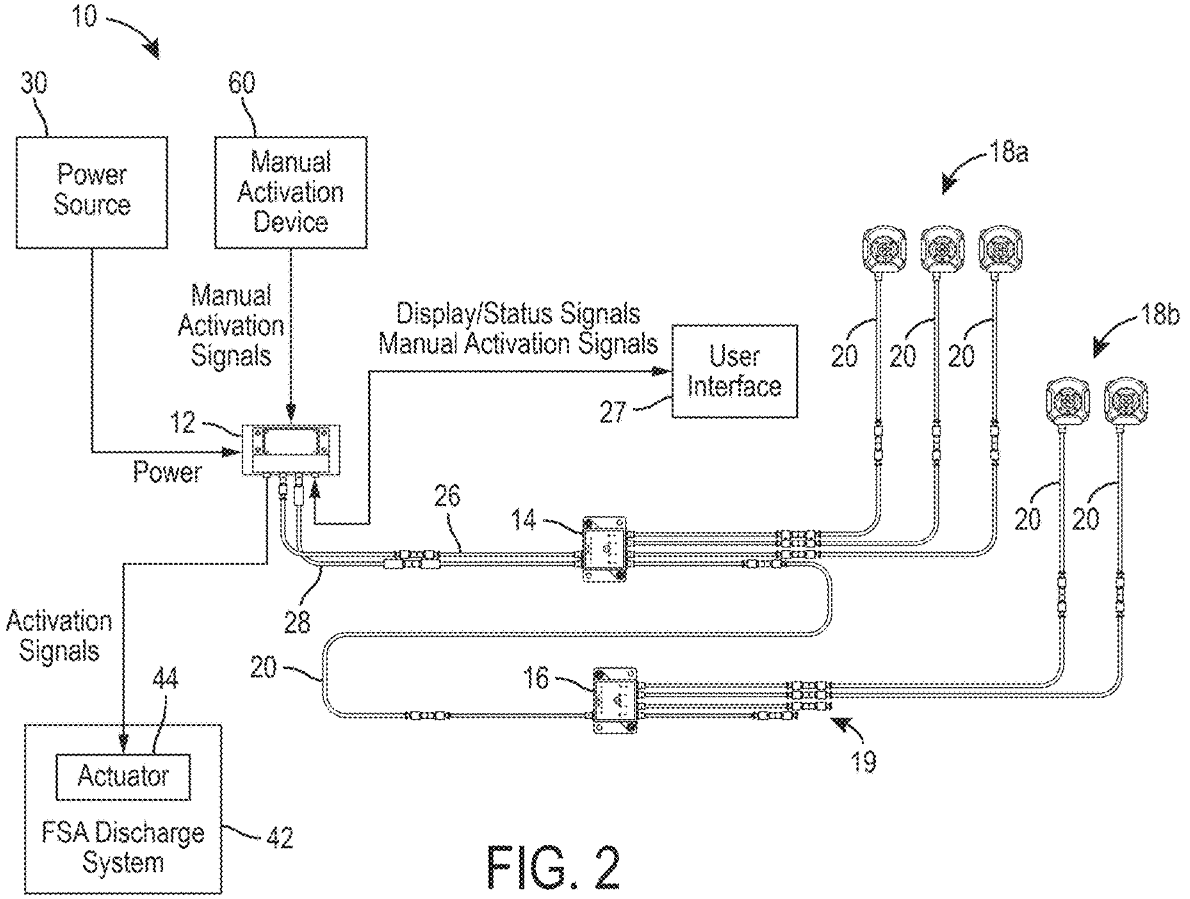
FIG. 2 is a block diagram of the fire detection and suppression system of FIG. 1, according to some embodiments.

Referring particularly to FIGS. 1 and 2, a fire detection and suppression system 10 includes one or more sensors 18, and an interface control module 12. Interface control module 12 can be a controller including a processing circuit, a processor, and memory. Interface control module 12 is configured to communicably connect with sensors 18 to detect a presence of a fire or a fire condition or to predict the likely occurrence of a fire or a fire condition in the future. Interface control module 12 can be communicably coupled or communicatively connected with a fire suppressant agent (FSA) discharge system 42. Sensors 18 may generate a fire detection signal or a fire condition detection signal in response to detecting the fire or fire condition and can provide the fire detection signal or the fire condition detection signal to upstream communicably coupled devices (e.g., interface control module 12, an interface module 14, an interface expansion module 16, etc.). Particularly, interface control module 12 can be communicably coupled with one or more actuators 44 of FSA discharge system 42. Interface control module 12 can receive sensor signals from sensors 18 and activate FSA discharge system 42. Interface control module 12 can activate FSA discharge system 42 by generating activation signals and providing the activation signals to FSA discharge system 42. In some embodiments, interface control module 12 receives manual activation signals from manual activation device 60 and activates FSA discharge system 42 in response to receiving the manual activation signals.

In some embodiments, FSA discharge system 42 includes tanks, reservoirs, containers, etc., configured to store and discharge a fire suppressant agent. FSA discharge system 42 can include a plumbing or piping system configured to fluidly couple the tanks of fire suppressant agent with nozzles, dispersion devices, sprayers, outlets, etc., to disperse, spread, discharge, provide, etc., the fire suppressant agent to an area of interest. FSA discharge system 42 can also include cartridges that store a compressed or expellant gas. The cartridges can be fluidly coupled with a corresponding fire suppressant tank. When interface control module 12 provides actuator(s) 44 with activation signals, actuator 44 can operate to fluidly couple the cartridge with the corresponding fire suppressant tank. Actuator 44 can be an electric actuator, a mechanical transducer, an electric pneumatic actuator, a protracting actuation device, etc. Actuator 44 can be configured to puncture a rupture disk to fluidly couple the cartridge with the corresponding fire suppressant tank.

When the fire suppressant tank is fluidly coupled with the cartridge, the expellant or compressed gas is provided to the fire suppressant tank from the cartridge, thereby pressurizing the fire suppressant agent within the tank. The fire suppressant agent is then forced to flow through the piping or plumbing system and is discharged through the dispersion devices to suppress a fire at the area of interest.

Fire detection and suppression system 10 can be configured to detect and suppress fires on mobile equipment, commercial vehicles, industrial vehicles, etc. For example, fire detection and suppression system 10 can be used on haulers, hydraulic excavators, wheeled loaders, dozers, graders, etc. Fire detection and suppression system 10 can be used to suppress fire at an engine bay of mobile equipment. For example, fire detection and suppression system 10 can be used to suppress fire at an internal combustion engine such as a diesel engine, a gasoline engine, a compressed natural gas engine, etc. In some embodiments, fire detection and suppression system 10 includes multiple detection circuits and can detect fires in multiple areas. Fire detection and suppression system 10 can also be used to detect and suppress fires at or in buildings, sheds, utility closets, houses, kitchen appliances, cookers, fryers, data storage systems, etc., or any other device, apparatus, system, etc., for which fire suppression is desired.

Sensors 18 can be optical sensors configured to monitor one or more areas of interest and detect a presence of fire at the one or more areas of interest. In some embodiments, sensors 18 are temperature sensors. Sensors 18 can be any photoconductive devices, photovoltaic or solar cells, infrared detectors, photodiodes, phototransistors, optical switches, etc., to detect light intensity and/or light wavelength and generate an electrical signals based on the detected light intensity and/or the light wavelength.

Sensors 18 can be configured to use RS-485 digital communications to report their respective statuses. In some embodiments, the statuses of sensors 18 include a normal state (e.g., no fault, no alarm, etc.), and a fault or alarm state. Sensors 18*a* can generate signals that indicate their respective states or statuses and provide the signals to an interface module 14. In some embodiments, sensors 18 are wiredly and/or communicably coupled with interface module 14 through cables, cords, or wires, shown as bus cables 20.

In response to receiving an alarm or alert signal from sensors 18, interface module 14 converts the received signal to an alarm condition by closing a set of contacts within interface module 14 which can be read by interface control module 12 as an alarm condition. Interface module 14 can be communicably or electrically coupled with interface control module 12 through bus cables 20. Interface control module 12 can receive signals associated with closing the set of contacts within interface module 14. Any fault condition at interface module 14 or any connected devices such as sensors 18 (e.g., an open-circuit, a wire-to-ground short, a wire-to-wire short, etc.) causes a fault relay of interface module 14 to open which can be read by interface control module 12. Interface control module 12 can report a "Detection Circuit Open Fault" or any other fault message/notification to user interface 27 which can be displayed to a user or operator.

In some embodiments, interface module 14, interface expansion module 16, and/or interface control module 12 are configured to latch a signal (e.g., a fire detection signal) from optical sensors 18 or from further downstream after a "combined" five seconds or more (e.g., after the signal persists for at least five seconds, or any other predetermined amount of time). In some embodiments, the signal is latched and maintained if a first one of optical sensors 18 detects a fire condition (e.g., a flame) and then three seconds later a second one of optical sensors 18 detects the fire condition before the first optical sensor 18 does not see or detect the fire condition, with the total time being greater than five seconds. In such a case, the signal (e.g., the fire detection signal) is latched or maintained at the interface control module 12.

Interface module 14 can include status LEDs as well as a reset button on a front face of interface module 14. Interface module 14 can include an output circuit. Interface module 14 (i.e., the output circuit of interface module 14) can operate the LEDs to display a current status of any downstream devices or interface modules 14. Interface module 14 can operate the LEDs to display a solid green for a normal or standby condition, amber or yellow for a fault condition, and red for an active alarm or alert. The LEDs can be latched or persist in their operation so that any alarm or fault condition that occurs in the circuit shown in FIGS. 1-2 latches a corresponding one of the LEDs to the appropriate condition. Advantageously, this facilitates easier troubleshooting of the circuit shown in FIGS. 1-2 if intermittent faults or spurious alarms occur. For example, if a particular one of sensors 18 undergoes an intermittent fault that clears, the corresponding LED to the particular sensor 18 may latch the amber or yellow color, indicating that the circuit had a fault. If the fault clears, the particular sensor 18 can resume normal operation, but the corresponding LED may remain amber or yellow. If a subsequent fire occurs, the particular sensor 18 can still detect the fire and interface module 14 can report the fire condition to interface control module 12 through bus cables 20, and the corresponding LED may change from amber/yellow to red. The corresponding LED can remain in this state until the reset button of interface module 14 is pressed for a predetermined amount of time (e.g., 3 seconds, 5 seconds, etc.).

In some embodiments, interface module 14 is configured to operate the LEDs according to different blink rates (e.g., based on downstream faults, downstream fire detection, etc.). For example, interface module 14 may operate the LEDs according to different blink rates or adjust a blink rate of the LEDs based on an activation of fire detection and suppression system 10 or based on fire detection at sensors 18.

Interface module 14 can be configured to be connected onto any of multiple detection circuits that interface control module 12 monitors. For example, interface module 14 can be connected to interface control module 12 in conjunction with a linear detection cable on the same detection circuit, or connected separately to a dedicated detection circuit using a standard detection circuit cable. In some embodiments, the linear detection cable is required in the same hazard areas that corresponding sensors 18 are configured to monitor. Certain customers may desire to have sensors 18 on a different or separate detection circuit so that faults/alarms detected by sensors 18 can be differentiated from faults/alarms of the linear detection cable. The linear detection cable can be connected with interface control module 12 prior to connection of a first interface module 14 to interface control module 12.

Each interface module 14 is configured to connect with or interface with up to three sensors 18 (e.g., sensors 18*a*), according to some embodiments. Additional sensors 18*b* can be added to the circuit through an interface expansion module 16. Unused interfaces of interface module 14 and/or interface expansion module 16 can be terminated with a plug 19. If no additional interface modules 14 and/or interface expansion modules 16 are added to the circuit, an output of interface modules 14 and/or interface expansion modules 16 can be terminated with a 5-pin M12 end of line (EOL) device.

Interface module 14 and interface expansion module 16 can be constructed the same as or similar to each other. However, interface module 14 can include power and detection conductors in a single cable. All other characteristics of interface module 14 and interface expansion module 16 (e.g., PCB board, enclosure, etc.) can be the same or similar to each other.

Table 1 below shows the colors displayed by the LEDs of interface module 14 and interface expansion module 16 for various conditions:

TABLE 1

LED Colors and Associated Conditions

| | Color | | |
|---|---|---|---|
| Condition | Green | Amber/Yellow | Red |
| Normal (Stand-by) | X | | |
| Open-Circuit Fault | | X | |
| Wire-to-Ground Fault | | X | |
| Wire-to-Wire Short | | X | |
| Alarm | | | X |

Specifically, the LEDs of interface module 14 and/or interface expansion module 16 can display a green color if the corresponding sensor 18 or circuit is operating normally. If the corresponding sensor 18 provides interface module 14 and/or interface expansion module 16 with an alarm or alert, the corresponding LED can display a red color. For faults such as open-circuit fault, wire-to-ground fault, wire-to-wire short, etc., the corresponding LED can display an amber or yellow color. For example, if one of the bus cables 20 shorts (e.g., wire-to-ground fault), the corresponding LED of interface module 14 and/or interface expansion module 16 may operate to display an amber or yellow color. The LED can continue displaying the amber or yellow color even if the corresponding bus cable 20 and/or the corresponding sensor 18 returns to a normal mode of operation. Advantageously, this facilitates allowing a technician to troubleshoot intermittent faults and to determine which of bus cables 20 and/or sensors 18 has faulted, even after the circuit or sensors 18 return to normal operation. According to alternative embodiments, other colors than those disclosed herein may be used and other states may be indicated.

In some embodiments, interface control module 12, interface module 14, and/or interface expansion module 16 have a voltage operating range of 9-32 volts DC. Advantageously, this facilitates the circuit accommodating typical nominal 12 volt and/or 24 volt heavy-duty mobile equipment (HDME) systems. In some embodiments, interface control module 12, interface module 14, and/or interface expansion module 16 have an operating temperature range of approximately −40 degrees Celsius to +85 degrees Celsius (or −40 degrees Fahrenheit to 185 degrees Fahrenheit). In some embodiments, interface control module 12 can communicably connect with up to three interface modules 14 and interface expansion modules 16 (e.g., one interface module 14 and two interface expansion modules 16). A maximum power circuit length used to power interface module 14 (and/or interface expansion modules 16) may be 200 feet for 12 volt nominal systems, and 300 feet for 24 volt nominal systems. In some embodiments, a maximum cable length between sensors 18 and a corresponding interface module 14 and/or interface control module 16 is 200 feet for 12 and 24 volt nominal systems. In some embodiments, a maximum length of cable (e.g., bus cable 20) between interface modules 14 (and interface expansion modules 16) is 100 feet for 12 volt nominal systems and 250 feet for 24 volt nominal systems.

In general, fire detection and suppression system 10 does not include contact between dissimilar metals, which could facilitate galvanic reaction, except where necessary. Additionally, fire detection and suppression system 10 does not include any exposed brass. All electronic components and solder of fire detection and suppression system 10 are RoHS compliant.

Interface Module

Figure 3:
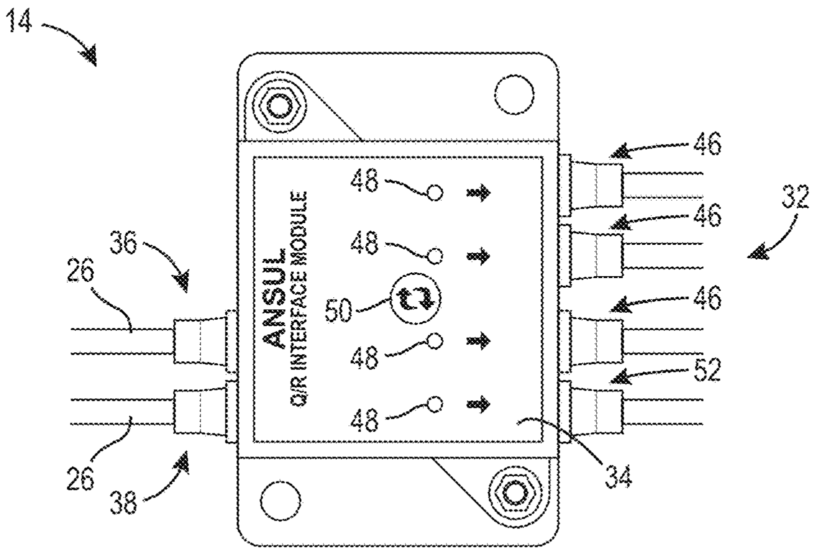
FIG. 3 is a top view of the interface module of the fire detection and suppression system of FIG. 1, according to some embodiments.

Referring particularly to FIG. 3, interface module 14 is shown in greater detail, according to an exemplary embodiment. Interface module 14 includes a connector 32 configured to communicably connect with sensors 18 and interface expansion module 16. Connector 32 can be a female bus connector pigtail assembly. Connector 32 is configured to receive and connect with bus cables 20. Connector 32 includes sensor input connectors 46 and expansion input connector 52. In some embodiments, sensor input connectors 46 and expansion input connector 52 are all configured to wiredly and communicably couple with a same type of cable (e.g., bus cable 20). Sensor input connectors 46 can be configured to receive and communicably couple with bus cables 20 of corresponding sensors 18. Expansion input connector 52 is similarly configured to receive and communicably couple with bus cable 20 of a corresponding interface expansion module 16. In some embodiments, interface module 14 includes LEDs 48 that correspond to each connected bus cable 20 (e.g., three sensors 18 and interface expansion module 16).

LEDs 48 can operate to display red, green, or yellow/amber color in response to any of the conditions described in greater detail above with reference to Table 1. For example, LEDs 48 can display a green color in response to normal operation for corresponding sensors 18 and/or corresponding interface expansion module 16. In response to a fault or an intermittent fault, LEDs 48 can display and hold (or latch) the yellow/amber color. For example, if a particular one of sensors 18 malfunctions, the corresponding one of LEDs 48 may operate to display the yellow/amber color and hold the yellow/amber color to facilitate troubleshooting of the fault. Likewise, if interface expansion module 16 or any sensor, interface expansion module 16, bus cable 20, etc., connected to interface module 14 malfunctions, the corresponding LED 48 may operate to display the yellow/amber color and hold the yellow/amber color to facilitate troubleshooting the fault.

Referring still to FIG. 3, interface module 14 includes a reset button 50. In some embodiments, reset button 50 can be pressed and held for a predetermined time duration (e.g., 3 seconds) to clear faults. For example, if one of LEDs 48 holds the yellow/amber color, reset button 50 can be pressed and held for the predetermined time duration to reset LED 48 to display the green color. In some embodiments, pressing, holding, and releasing reset button 50 clears faults (e.g., returns LEDs 48 to display the green color) for all bus cables 20 that are connected to interface module 14 (e.g., sensor input connectors 46, and expansion input connector 52).

Interface module 14 includes an enclosure 34 (e.g., a housing, a container, a mold, a shell, a body, etc.) configured to substantially enclose and protect internal components of interface module 14. For example, enclosure 34 can be configured to enclose and protect switches, relays, processors, processing circuits, memory, PCB boards, etc., of interface module 14. In some embodiments, enclosure 34 is filled with a resin to seal against environmental factors, thereby protecting internal components of interface module 14.

Referring still to FIG. 3, interface module 14 includes a power connector 38. Power connector 38 is configured to receive power through a corresponding power cable 28 to power interface module 14. In some embodiments, interface module 14 receives power from power source 30 through power cable 28 and power connector 38. Power cable 28 can connect directly to a battery (e.g., a vehicle battery, power source 30) via a fused power cable, or can connect to a power output of interface control module 12 (as shown in FIGS. 1-2).

Interface module 14 includes a detection connector 36. Detection connector 36 is configured to receive a corresponding detection cable 26 to communicably connect interface module 14 with interface control module 12.

Figure 4:
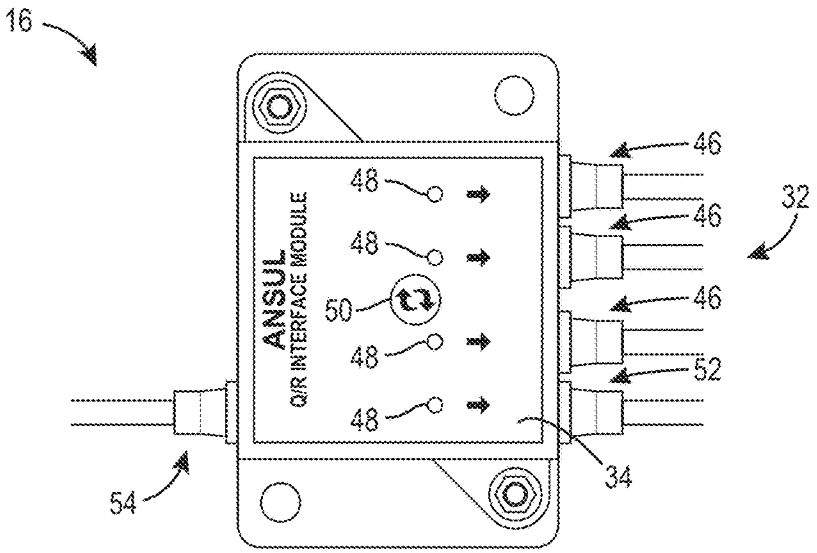
FIG. 4 is a top view of the interface expansion module of the fire detection and suppression system of FIG. 1, according to an exemplary embodiment.

Referring now to FIG. 4, interface expansion module 16 is shown in greater detail, according to an exemplary embodiment. Interface expansion module 16 can be the same as or similar to interface module 14. For example, interface expansion module 16 can include the same processing circuit, PCB, connectors, etc., as interface module 14. Likewise, interface expansion module 16 can also include enclosure 34 to enclose and protect internal components.

Interface expansion module 16 can include both input power and detection in a single cable, shown as connector 54. A cable the same as or similar to bus cable 20 can communicably and electrically couple interface expansion module 16 with interface module 14. Interface expansion module 16 can provide interface module 14 with any signals received from sensors 18 that are downstream of interface expansion module 16. For example, interface expansion module 16 can receive fault or alarm signals from sensors 18 that are connected through sensor input connectors 46 and provide any of the fault or alarm signals to interface module 14 through connector 54. Interface expansion module 16 can also receive power from interface module 14 through connector 54.

Interface expansion module 16 can include LEDs 48 and reset button 50. LEDs 48 can operate to continuously display the amber/yellow color in response to a fault in one of sensors 18 (or a further downstream interface expansion module 16) until reset button 50 is pressed for a predetermined time duration (e.g., 3 seconds). If interface expansion module 16 receives a fault (e.g., an intermittent fault signal) from one of sensors 18 or from a further downstream interface expansion module 16, interface expansion module 16 can provide interface module 14 with a fault signal through connector 54 and the corresponding cable. Interface module 14 can receive the fault signal through the corresponding cable and expansion input connector 52. Interface module 14 can operate the corresponding LED 48 to display and hold the yellow/amber color until reset button 50 of interface module 14 is pressed and held for the predetermined time duration.

Additional interface expansion modules 16 can be daisy-chained in series such that additional sensors 18 can be integrated into fire detection and suppression system 10. For example, interface module 14 can be communicably connected with interface control module 12 via detection connector 36 (wiredly coupled with the red connector shown in FIG. 2) and the corresponding detection cable 26. Interface module 14 can receive power from interface control module 12 through power connector 38 and power cable 28 (wiredly coupled with the green connector shown in FIG. 2) unless connected directly to vehicle power. Interface expansion module 16 can be communicably connected with interface module 14 via expansion input connector 52 and connector 54 through a corresponding bus cable 20. Additional interface expansion modules 16 can be installed in series in fire detection and suppression system 10 through subsequent connectors 54 and expansion input connectors 52. In this way, all of the signals generated by sensors 18 can be provided to interface control module 12.

Sensors

Figure 5:
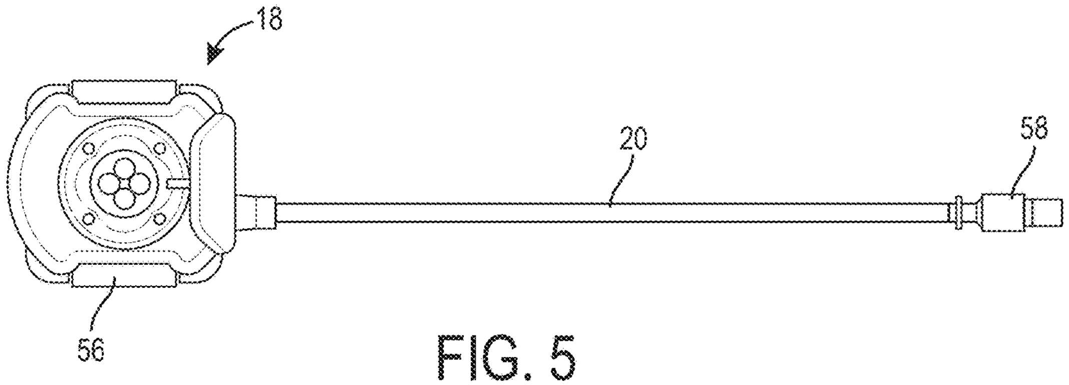
FIG. 5 is a top view of one of the sensors of the fire detection and suppression system of FIG. 1, according to some embodiments.

Referring now to FIG. 5, sensor 18 is shown in greater detail, according to an exemplary embodiment. Sensors 18 can be infrared optical sensors configured to monitor an area of interest for fire detection. Sensor 18 can include an enclosure 56. Enclosure 56 can be similar to enclosure 34, and is configured to enclose and protect internal components (e.g., processing circuit, PCB boards, processors, microprocessors, etc.) of sensor 18. The internal components (e.g., the PCB board) of sensor 18 can be communicably connected with a corresponding interface module 14 and/or interface expansion modules 16 through bus cable 20. Bus cable 20 can include a male (or female) connector 58. Connector 58 is configured to be received by, and communicably/electrically connect with any of sensor input connectors 46. Sensor 18 can include a processing circuit configured to perform flame detection based on sensor signals. For example, the processing circuit can include firmware for processing any of the sensor signals to determine if a fire or a fire condition is present at the area of interest.

Technician Diagnosis

Advantageously, any of the components, devices, modules, sensors, etc., of fire detection and suppression system 10 may be plug-and-play devices. This facilitates easy installation, removal, and replacement of the various components that make up fire detection and suppression system 10. All of the sensor signals received from sensors 18 can be provided to interface control module 12. Interface control module 12 can include a memory and can generate logs. The logs can be accessed from interface control module 12 via a communications port. In some embodiments, the logs include fire detection information (e.g., times at which sensors 18 detected a fire or a fire condition).

Interface control module 12 can operate FSA discharge system 42 to provide fire suppressant agent to the area of interest (the monitored area) to suppress the fire. In some embodiments, interface control module 12 operates FSA discharge system 42 to provide fire suppressant agent to the area of interest in response to any of sensors 18 detecting a fire or a fire condition.

A technician can troubleshoot faults in fire detection and suppression system 10 by examining LEDs 48 of interface module 14 and/or interface expansion modules 16. For example, the technician may inspect the LEDs 48 of interface module 14. If any of the LEDs 48 display the yellow/amber color, the technician knows that the corresponding sensor 18 has undergone faults in the past. If the LED 48 that corresponds with interface expansion module 16 displays the yellow/amber color, the technician knows that a fault has occurred further downstream in the circuit. The technician can then view LEDs 48 of the interface expansion module 16 to identify which of sensors 18 is faulting. If LED 48 of interface expansion module 16 that corresponds to a further downstream interface expansion module 16 displays the yellow/amber color, the technician can then examine/inspect the further downstream interface expansion module 16 to identify which sensor 18 is faulting.

In this way, LEDs 48 can be used to continuously display the amber/yellow color even for an intermittent fault. This facilitates allowing a technician to troubleshoot faulty sensors 18. The technician can then remove and replace the faulty sensor 18. The technician can clear the LEDs 48 by pressing and holding the reset button 50 of interface module 14 and/or one of interface expansion modules 16.

Fire Suppressant Agent Discharge System

Figure 6:
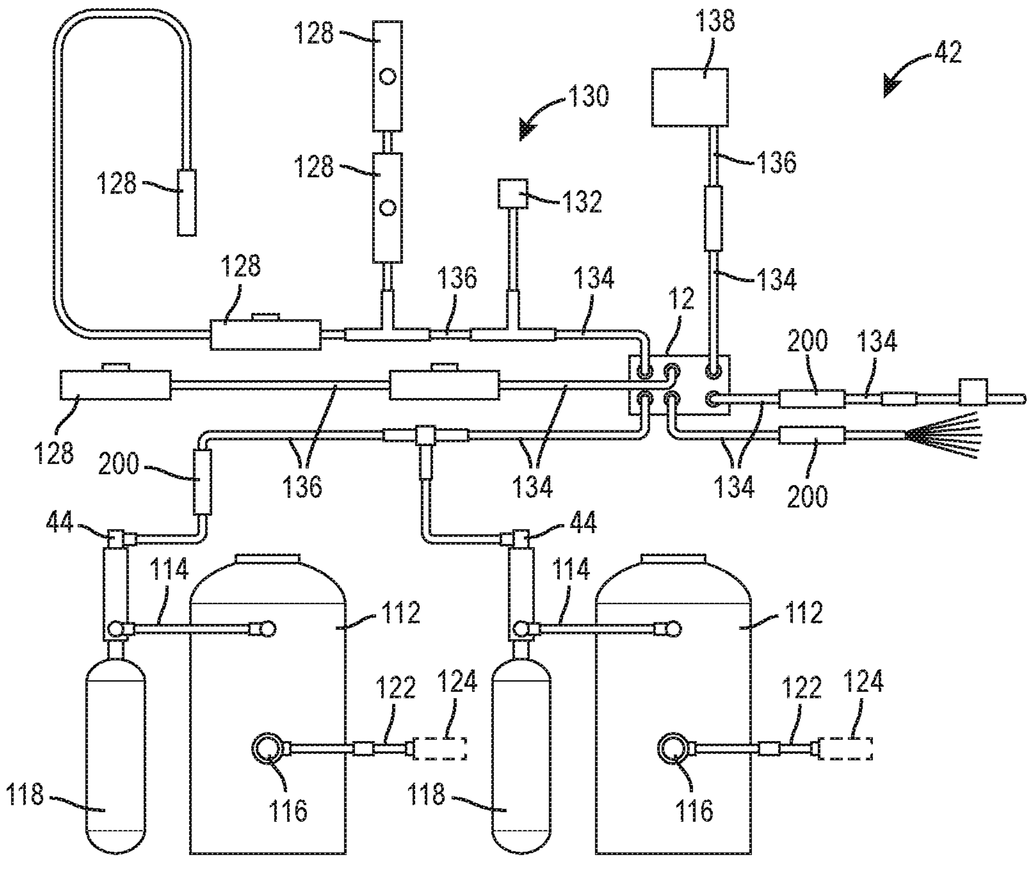
FIG. 6 is an illustration of a fire suppressant delivery system that can be activated by the fire detection and suppression system of FIG. 1, according to some embodiments.

Referring now to FIG. 6, FSA discharge system 42 is shown according to an exemplary embodiment. In one embodiment, FSA discharge system 42 is a chemical fire suppression system. FSA discharge system 42 is configured to dispense or distribute a fire suppressant agent onto and/or nearby a fire, extinguishing the fire and preventing the fire from spreading. FSA discharge system 42 can be used alone or in combination with other types of fire suppression systems (e.g., a building sprinkler system, a handheld fire extinguisher, etc.). In some embodiments, multiple FSA discharge systems 42 are used in combination with one another to cover a larger area (e.g., each in different rooms of a building).

FSA discharge system 42 can be used in a variety of different applications. Different applications can require different types of fire suppressant agent and different levels of mobility. FSA discharge system 42 is usable with a variety of different fire suppressant agents, such as powders, liquids, foams, or other fluid or flowable materials. FSA discharge system 42 can be used in a variety of stationary applications. By way of example, FSA discharge system 42 is usable in kitchens (e.g., for oil or grease fires, etc.), in libraries, in data centers (e.g., for electronics fires, etc.), at filling stations (e.g., for gasoline or propane fires, etc.), or in other stationary applications. Alternatively, FSA discharge system 42 can be used in a variety of mobile applications. By way of example, FSA discharge system 42 can be incorporated into land-based vehicles (e.g., racing vehicles, forestry vehicles, construction vehicles, agricultural vehicles, mining vehicles, passenger vehicles, refuse vehicles, etc.), airborne vehicles (e.g., jets, planes, helicopters, etc.), or aquatic vehicles, (e.g., ships, submarines, etc.).

Referring still to FIG. 6, FSA discharge system 42 includes one or more fire suppressant tanks 112 (e.g., vessels, containers, vats, drums, tanks, canisters, cartridges, cans, etc.). Fire suppressant tank 112 is filled (e.g., partially, completely, etc.) with fire suppressant agent. In some embodiments, the fire suppressant agent is normally not pressurized (e.g., is near atmospheric pressure). Fire suppressant tank 112 includes an exchange section, shown as hose 114 and an outlet section (e.g., an aperture, a valve, etc.), shown as outlet valve 116. Hose 114 permits the flow of expellant gas into fire suppressant tank 112 and the flow of fire suppressant agent out of fire suppressant tank 112 through outlet valve 116 so that the fire suppressant agent can be supplied to a fire or a fire condition.

FSA discharge system 42 further includes a cartridge 118 (e.g., a vessel, container, vat, drum, tank, canister, cartridge, or can, etc.). Cartridge 118 is configured to contain a volume of pressurized expellant gas. The expellant gas can be an inert gas. In some embodiments, the expellant gas is air, carbon dioxide, or nitrogen. Cartridge 118 can be rechargeable or disposable after use.

FSA discharge system 42 further includes a valve, puncture device, or activator assembly, shown as actuator 44. Actuator 44 is configured to selectively fluidly couple cartridge 118 to fire suppressant tank 112 to facilitate activation of FSA discharge system 42. Decoupling cartridge 118 from actuator 44 may facilitate removal and replacement of cartridge 118 when cartridge 118 is depleted.

Once actuator 44 is activated and cartridge 118 is fluidly coupled to hose 114, the expellant gas from cartridge 118 flows freely through hose 114. The expellant gas forces fire suppressant agent from fire suppressant tank 112 out through outlet valve 116 and into a conduit or hose, shown as pipe 122. In one embodiment, hose 114 directs the expellant gas from cartridge 118 to fire suppressant tank 112 (e.g., to a top portion of fire suppressant tank 112). The pressure of the expellant gas within fire suppressant tank 112 forces the fire suppressant agent to exit through outlet valve 116. In other embodiments, the expellant gas enters a bladder within fire suppressant tank 112, and the bladder presses against the fire suppressant agent to force the fire suppressant agent out through outlet valve 116. In some embodiments, fire suppressant tank 112 includes a burst disk that prevents the fire suppressant agent from flowing out through hose 114 until the pressure within fire suppressant tank 112 exceeds a threshold pressure. Once the pressure exceeds the threshold pressure, the burst disk ruptures, permitting the flow of fire suppressant agent. Alternatively, fire suppressant tank 112 can include a valve, a puncture device, or another type of opening device or activator assembly that is configured to fluidly couple fire suppressant tank 112 to pipe 122 in response to the pressure within fire suppressant tank 112 exceeding the threshold pressure. Such an opening device can be configured to activate mechanically (e.g., the force of the pressure causes the opening device to activate, etc.), fluidly (e.g., using a pressurized liquid or gas), or electrically (e.g., in response to receiving an electrical signal from a controller). The opening device may include a separate pressure sensor in communication with fire suppressant tank 112 that causes the opening device to activate.

Pipe 122 is fluidly coupled to one or more outlets or sprayers, shown as nozzles 124. The fire suppressant agent flows through pipe 122 and to nozzles 124. Nozzles 124 each define one or more apertures, through which the fire suppressant agent exits, forming a spray of fire suppressant agent that covers a desired area. The sprays from nozzles 124 then suppress or extinguish fire within that area. The apertures of nozzles 124 can be shaped to control the spray pattern of the fire suppressant agent leaving nozzles 124. Nozzles 124 can be aimed such that the sprays cover specific points of interest (e.g., a specific piece of restaurant equipment, a specific component within an engine compartment of a vehicle, etc.). Nozzles 124 can be configured such that all of nozzles 124 activate simultaneously, or nozzles 124 can be configured such that only nozzles 124 near the fire are activated.

FSA discharge system 42 further includes or is communicably connected with interface control module 12 that controls the activation of actuator 44. Interface control module 12 is configured to monitor one or more conditions and determine if those conditions are indicative of a nearby fire. Upon detecting a nearby fire, interface control module 12 activates actuator 44, causing the fire suppressant agent to leave nozzles 124 and extinguish the fire.

Actuator 44 can be configured to activate in response to receiving an electrical signal from interface control module 12. Referring still to FIG. 6, interface control module 12 can monitor signals from one or more sensors, shown as temperature sensors 128 (e.g., linear thermal detector, spot thermal detector, etc.). Interface control module 12 can use the signals from temperature sensors 128 and/or sensors 18 to determine if an ambient temperature has exceeded a threshold temperature or to optically detect a fire or a fire condition. Upon determining that the ambient temperature has exceeded the threshold temperature, or optically detecting a fire or a fire condition, interface control module 12 provides an electrical signal to actuator 44. Actuator 44 then activates in response to receiving the electrical signal.

FSA discharge system 42 further includes a manual activation system 130 that controls the activation of actuator 44. Manual activation system 130 is configured to activate actuator 44 in response to an input from an operator. Manual activation system 130 can be included instead of or in addition to interface control module 12. Both interface control module 12 and manual activation system 130 can activate actuator 44 independently. By way of example, interface control module 12 can activate actuator 44 regardless of any input from manual activation system 130, and vice versa.

Actuator 44 can additionally or alternatively be configured to activate in response to receiving an electrical signal from manual activation system 130. As shown in FIG. 6, button 132 is operably coupled to interface control module 12. By way of example, interface control module 12 can be configured to monitor a signal from button 132 to determine if button 132 is pressed. Upon detecting that button 132 has been pressed, interface control module 12 sends an electrical signal to actuator 44 to activate actuator 44.

Interface control module 12 can be configured to monitor the status of and output information to a human interface device 138 (e.g., engaged, disengaged, etc.). In some embodiments, human interface device 138 is the same as (or similar to) or includes user interface 27. Upon determining that human interface device 138 is engaged, interface control module 12 provides electrical signals to human interface device 138. By way of example, interface control module 12 receives a first electrical signal from either manual activation device 60 or temperature sensors 128 (or sensors 18) that button 132 has been pressed or the temperature has reached the threshold temperature (or that a fire or a fire condition has optically been detected). In response to the first electrical signal, a second electrical signal is sent from interface control module 12 to human interface device 138. The second electrical signal is configured to notify a user by way of a notification device (e.g., an LED, an auditory signal, etc.) on human interface device 138.

In some embodiments, human interface device 138 and interface control module 12 are configured to be the same device, such that interface control module 12 incorporates notification devices directly into interface control module 12. Interface control module 12 is then configured to replace human interface device 138 in FSA discharge system 42.

An electrical wire 136 is utilized for the transfer of the electrical signals in response to the activation of manual activation system 130 or temperature sensors 128 (or sensors 18) determine that the ambient temperature has exceeded the threshold temperature (or that a fire or fire condition is optically detected). The electrical signals are sent from manual activation system 130 and/or one or more of temperatures sensors 128 through electrical wire 136 and quick attach wires 134 to interface control module 12. Electrical wires 136 and quick attach wires 134 are connected through an electrical wire connection 200.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fire suppression system as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

Additionally, any element disclosed in one embodiment may be incorporated or utilized with any other embodiment disclosed herein. For example, the sensor 18 may be incorporated in the FSA discharge system 42. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A fire suppression system, comprising:

an interface control module configured to activate a fire suppressant discharge system in response to receiving a fire detection signal; and an interface module connected with the interface control module, and connected with at least one of a first optical sensor and a first interface expansion module of a plurality of interface expansion modules;

wherein the first interface expansion module is communicably coupled to the interface control module through the interface module and is configured to connect with a second optical sensor, and each of the plurality of interface expansion modules are configured to connect with a corresponding optical sensor and a downstream one of the plurality of interface expansion modules;

wherein the first optical sensor and the second optical sensor are configured to detect a fire condition at an area of interest and provide the fire detection signal to the interface control module in response to detecting the fire condition;

wherein the interface module comprises a plurality of light emitting devices including a first light emitting device corresponding to the first optical sensor and a second light emitting device corresponding to the plurality of interface expansion modules and the corresponding optical sensor, the first light emitting device configured to display different colors indicating a status of the first optical sensor and the second light emitting device configured to display different colors indicating a status of the plurality of interface expansion modules and the corresponding optical sensors upstream of the interface module.

2. The fire suppression system of claim 1, wherein the plurality of light emitting devices are configured to display a first color when the first optical sensor and the plurality of interface expansion modules are operating normally, a second color when the first optical sensor or the plurality of interface expansion modules undergo a fault, and a third color when the first optical sensor or the second optical sensor of the first interface expansion module, or any of the corresponding optical sensors of the plurality of interface expansion modules, detect a fire condition.

3. The fire suppression system of claim 2, wherein the plurality of light emitting devices are configured to continually display the second color in response to a downstream fault.

4. The fire suppression system of claim 3, wherein the interface module comprises a reset button, wherein the plurality of light emitting devices are configured to cease continually displaying the second color in response to the reset button being depressed for a predetermined amount of time.

5. The fire suppression system of claim 1, wherein the interface module and the plurality of interface expansion modules are each configured to connect with three corresponding optical sensors, wherein the interface module and the plurality of interface expansion modules each include three light emitting devices corresponding to the three corresponding optical sensors.

6. The fire suppression system of claim 5, wherein the interface module comprises the second light emitting device associated with the first interface expansion module, wherein the second light emitting device is configured to display different colors to indicate the status of any of the three corresponding optical sensors connected with the first interface expansion module.

7. The fire suppression system of claim 1, wherein the first interface expansion module comprises a third light emitting device corresponding to the second optical sensor, wherein the third light emitting device is configured to display different colors indicating a status of the second optical sensor.

8. The fire suppression system of claim 7, wherein the third light emitting device of the first interface expansion module is configured to display a first color in response to the second optical sensor operating normally, a second color in response to the second optical sensor undergoing a fault, and a third color in response to the second optical sensor detecting a fire condition.

9. The fire suppression system of claim 8, wherein the third light emitting device of the first interface expansion module is configured to continually display the second color in response to the second optical sensor undergoing a fault and continue displaying the second color after the second optical sensor ceases undergoing the fault;

wherein the third light emitting device of the first interface expansion module is configured to cease displaying the second color in response to a user input.

10. The fire suppression system of claim 1, wherein the plurality of interface expansion modules configured to connect with at least three optical sensors.

11. The fire suppression system of claim 1, wherein the optical sensors are infrared optical sensors and are configured to generate sensor signals, wherein the sensor signals comprise either a standby signal, or the fire detection signal.

12. A fire suppression system, comprising:

a plurality of first sensors configured to detect a fire condition and generate fire detection signals in response to detecting the fire;

a plurality of interface expansion modules configured to receive the fire detection signals from a corresponding one of the plurality of first sensors and operate a first indicator to indicate a status of the corresponding one of the plurality of first sensors, wherein each of the plurality of interface expansion modules are connected with a downstream one of the plurality of interface expansion modules;

a second sensor configured to detect a fire condition and generate fire detection signals in response to detecting the fire condition;

an interface module configured to receive the fire detection signals from the second sensor and the fire detection signals from the plurality of interface expansion modules, wherein the interface module comprises a second indicator corresponding to the second sensor, and a third indicator corresponding to the first sensor and the plurality of first sensors and the plurality of interface expansion modules, wherein the second indicator is configured to display a status of the second sensor, and the third indicator is configured to display a status of the plurality of first sensors and the plurality of interface expansion modules upstream of the interface module; and an interface control module configured to receive a signal from the interface module indicating fire detection and activate a fire suppressant discharge system in response to the fire detection signals.

13. The fire suppression system of claim 12, wherein:

the first indicator is configured to display a first color when the corresponding one of the plurality of first sensors is operating normally, a second color when the corresponding one of the plurality of first sensors undergoes a fault, and a third color when the corresponding one of the plurality of first sensors detects a fire condition;

the second indicator is configured to display the first color when the second sensor is operating normally, the second color when the second sensor undergoes a fault, and the third color when the second sensor detects a fire condition; and the third indicator is configured to display the first color when are operating normally, the second color when at least one of the plurality of first sensors and the plurality of interface expansion module undergo a fault, and the third color when at least one of the plurality of first sensors or the plurality of interface expansion modules detect a fire condition.

14. The fire suppression system of claim 13, wherein the first indicator, the second indicator, and the third indicator are configured to continually display the second color in response to a downstream fault.

15. The fire suppression system of claim 14, wherein the interface module comprises a reset button, wherein the first indicator is configured to cease displaying the second color in response to the reset button being depressed for a predetermined amount of time.

16. The fire suppression system of claim 12, wherein the interface module and the plurality of interface expansion modules are each configured to connect with three sensors, wherein the interface module and the plurality of interface expansion modules each include an indicator configured to operate to display a status of any of the three sensors.

17. A fire suppression system, comprising:

a plurality of first sensors configured to detect a fire condition and generate fire detection signals in response to detecting the fire condition;

a plurality of interface expansion modules each configured to receive the fire detection signals from a corresponding one of the plurality of first sensors and operate a first indicator to indicate a status of the corresponding one of the plurality of first sensors, wherein each of the plurality of interface expansion modules are connected with a downstream one of the plurality of interface expansion modules;

a second sensor configured to detect a fire condition and generate fire detection signals in response to detecting the fire condition;

an interface module configured to receive the fire detection signals from the second sensor and a signal from the plurality of interface expansion modules indicating fire condition detection, wherein the interface module comprises a second indicator corresponding to the second sensor, and a third indicator corresponding to the first sensor and the plurality of interface expansion modules, wherein the second indicator is configured to display a status of the second sensor, and the third indicator is configured to display a status of the plurality of first sensors and the plurality of interface expansion modules upstream of the interface module; and an interface control module configured to receive the fire detection signals generated by any of the plurality of first sensors and the second sensor from the interface module and activate a fire suppressant discharge system in response to receiving the fire detection signals;

wherein the first indicator, the second indicator, and the third indicator are configured to continually indicate a fault status of a corresponding circuit including after the fault status of the corresponding circuit clears, until a user input is received.

18. The fire suppression system of claim 17, further comprising an additional interface expansion module, wherein the additional interface expansion module is connected with the interface expansion module and is configured to connect with three optical sensors.

19. The fire suppression system of claim 18, wherein the additional interface expansion module comprises a plurality of indicators, each of the plurality of indicators configured to operate to display a status of a corresponding one of the three optical sensors.

* * * * *